(12) United States Patent
Humpston et al.

(10) Patent No.: US 6,958,446 B2
(45) Date of Patent: Oct. 25, 2005

(54) COMPLIANT AND HERMETIC SOLDER SEAL

(75) Inventors: Giles Humpston, San Jose, CA (US); Yoshikatsu Ichimura, Tokyo (JP); Nancy M. Mar, Mountain View, CA (US); Daniel J. Miller, San Francisco, CA (US); Michael J. Nystrom, San Jose, CA (US); Heidi L. Reynolds, Palo Alto, CA (US); Gary R. Trott, San Mateo, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 311 days.

(21) Appl. No.: 10/124,166

(22) Filed: Apr. 17, 2002

(65) Prior Publication Data

US 2003/0198428 A1  Oct. 23, 2003

(51) Int. Cl.⁷ ............................. H01J 5/00; H05K 5/06
(52) U.S. Cl. ................. 174/50.61; 174/52.3; 174/52.4; 257/710; 257/729; 257/730
(58) Field of Search ...................... 257/710, 729–730; 174/52.3, 52.4, 50.61

(56) References Cited

U.S. PATENT DOCUMENTS

| | | | | |
|---|---|---|---|---|
| 3,823,468 A | * | 7/1974 | Hascoe ....................... 228/175 |
| 4,709,122 A | * | 11/1987 | Samuels .................... 174/52.4 |
| 5,050,034 A | * | 9/1991 | Hegner et al. ............ 361/283.4 |
| 5,064,782 A | * | 11/1991 | Nishiguchi ................. 228/121 |
| 5,168,344 A | * | 12/1992 | Ehlert et al. ................ 257/693 |
| 5,248,853 A | * | 9/1993 | Ishikawa et al. ............ 174/256 |
| 5,256,370 A | * | 10/1993 | Slattery et al. ............. 420/557 |
| 5,329,160 A | * | 7/1994 | Miura et al. ................. 257/710 |
| 5,821,161 A | * | 10/1998 | Covell et al. ............... 438/613 |
| 6,195,478 B1 | | 2/2001 | Fouquet |
| 6,259,608 B1 | * | 7/2001 | Berardinelli et al. ........ 361/777 |
| 6,324,316 B1 | | 11/2001 | Fouquet et al. |
| 6,459,160 B1 | * | 10/2002 | Goldmann et al. ......... 257/778 |
| 6,627,814 B1 | * | 9/2003 | Stark .......................... 174/52.3 |
| 6,713,862 B2 | * | 3/2004 | Palanisamy et al. ........ 257/703 |
| 6,848,610 B2 | * | 2/2005 | Liu ............................. 228/246 |

FOREIGN PATENT DOCUMENTS

| | | |
|---|---|---|
| GB | 2036794 | 7/1980 |
| GB | 2379630 | 3/2003 |
| JP | 7254840 | 10/1995 |

OTHER PUBLICATIONS

Humpston, Giles and Jacobson, David M., "Principles of Soldering and Brazing", ASM International, Materials Park, Ohio, pp. 123–127 (Mar. 1993).

Koehler, Dale R. et al., " Ultraminiature Resonator Accelerometer" Sandia Report SAND96-0971, UC-700 (Apr. 1996).

* cited by examiner

Primary Examiner—Cathy F. Lam

(57) ABSTRACT

A solder joint or seal attaching components having dissimilar coefficients of thermal expansion is made thin (e.g., less than 20 μm and preferably about 5 μm) and of a solder such as an indium-based solder that has a tendency to creep. The solder is toroidal or otherwise shaped to avoid tensile stress in the solder. Axial shearing stress in the solder causes reversible creep without causing failure of the joint or seal. In one embodiment, a toroidal solder seal has a diameter, a footprint, and a thickness in approximate proportions of 5000:200:1.

12 Claims, 2 Drawing Sheets

COMPLIANT AND HERMETIC SOLDER SEAL

BACKGROUND

Optical devices that control the routing of individual optical signals can enhance the functionality of an optical network by dynamically reconfiguring the optical network. Accordingly, a number of devices have been developed to control the routing of optical signals, particularly between different optical fibers. For example, U.S. patent application Ser. No. 6,324,316, entitled "Fabrication Of A Total Internal Reflection Optical Switch With Vertical Fluid Fill-Holes" to Fouquet et al. and U.S. Pat. No. 6,195,478, entitled "Planar Lightwave Circuit-Based Optical Switches Using Micromirrors in Trenches" to J. Fouquet describe optical switches that control routing of optical signals to and form optical fibers. These particular optical switches employ sealed cavities that are between integrated circuits and optical plates.

FIG. 1A shows a cross-sectional view of an optical switch 100 that includes an integrated circuit 110 and an optical plate 120. Integrated circuit 110 contains active circuitry that operates switching sites in optical switch 100 to control the routing of optical signals passing through optical switch 100. Optical plate 120 carries the optical signals and is made of an optical material such as fused silica (quartz) in which waveguides have been formed.

A seal 130 that attaches optical plate 120 to integrated circuit 110 holds optical plate 120 away from the active surface of integrated circuit 110 to thereby form a cavity 140 between integrated circuit 110 and optical plate 120. As shown in FIG. 1B, seal 130 predominantly follows the perimeter of integrated circuit 110 so that the active area on integrated circuit 110 is inside cavity 140. Accordingly, seal 130 and cavity 140 inherit the rectangular shape of integrated circuit 110.

For operation of optical switch 100, cavity 140 is filled with a fluid, and seal 130 must hermetically seal cavity 140 to prevent contamination of the fluid, keep the fluid in cavity 140, and provide optical switch 100 with an acceptable useful life. Making cavity 140 or any cavity truly hermetic is not currently possible. Manufacturers of ultra-high vacuum equipment are well aware that small molecules in gases such as helium can diffuse at appreciable rates though inches of solid steel. Hermeticity is therefore a relative measure of the leak-tightness of an enclosure, and the maximum acceptable leakage rate depends on the application.

For optical switch 100, cavity 140 can tolerate a "hermetic" seal with a leakage rate of about $1 \times 10^{-9}$ Pa·m$^3$/sec or lower. Integrated circuit 110 and optical plate 120 are dense materials and therefore have an intrinsic leakage rate below $1 \times 10^{-15}$ Pa·m$^3$/sec. The quality of seal 130 therefore controls the hermeticity of cavity 140.

Plastic and other organic materials, which might otherwise be suitable for seal 130, generally have open molecular structures that are unable to achieve leakage rates better than $1 \times 10^{-8}$ Pa·m$^3$/sec. Ceramics and glasses may be able to achieve the desired leakage rate but generally do not have the thermal and mechanical properties required for a durable seal. Neither do they have favorable characteristics for manufacturing a seal. Seal 130 is therefore preferably metallic.

For metal seal 130 to be hermetic, the metal must be sufficiently thick to present a fully dense barrier to diffusing gas, and the metal must form leak-free unions with the surfaces of the abutting components. Metal a few tens of microns thick in the direction perpendicular to the gas diffusion can provide the required diffusion barrier. Forming leak-free unions of metal seal 130 with optical plate 120 (quartz) and with integrated circuit 110 (silicon) generally requires that the areas of optical plate 120 and integrated circuit 110 be metalized. Making seal 130 is then a metal-to-metal joining problem.

Some of the options for metal-to-metal joining are solid phase welding, liquid phase welding, brazing, and soldering. Each of these processes has its merits and limitations. However, soldering is the most practical joining method because electrical fields, excessive temperature, and localized mechanical stress resulting from other metal joining processes can damage integrated circuit 110.

Selection of the most appropriate solder for seal 130 depends largely on the temperature limitations of the joining process and on the thermal and mechanical properties of the solder and the joined materials. All materials expand and contract, to a greater or lesser degree, with changes in temperature. The coefficient of thermal expansion (CTE) indicates the rate of expansion of a material with temperature and is typically expressed in units of ppm/° K. Quartz such as used in optical plate 120 has a CTE of about 0.5 ppm/° K and does not alter its physical size much over the normal temperature range for switch 100. Silicon in integrated circuit 110 has a CTE of approximately 2.5 ppm/° K, making the differential CTE between optical plate 120 and integrated circuit 110 about 2 ppm/° K.

Hermetic seal 130 must be able to absorb the resulting differential expansion and contraction of integrated circuit 110 and optical plate 120 if the temperature of optical switch 100 varies. Telecordia specifications, which are defined for all photonics parts and equipment, require that seal 130 remain intact on cyclic exposure to temperatures between −40° C. and +85° C. Ceramics and glass do not have sufficient ductility to accommodate the resulting physical displacement and therefore are not suitable seal materials. The preferred seal materials, solders, are also not well suited to this application because thermo-mechanical mechanisms can cause soldered joints to fail when subjected to cyclic thermal and/or physical stress. This is because solders do not have significant elastic ranges, so that essentially all deformation is plastic. Solders subject to constant stress thus fail by creep rupture, and solders subject to cyclic stress fail by fatigue. In both cases, the failure mechanism is microscopic structural changes that result in the formation of voids that coalesce to form fracture surfaces.

The traditional methods of circumventing these problems with solder seals have involved either designing products to minimize the net CTE mismatch or increasing the joint thickness to improve the stress distribution. An alternative approach is use of the most robust solder possible in order to buy the longest possible life. However, the so-called "hard solders" (e.g., Au-20Sn) invariably have high melting points, and their mechanical stiffness can distort joined components during cooling from the joining temperature.

In view of the drawbacks of current seals, improved seals and sealing methods are sought.

SUMMARY

Joining methods in accordance with embodiments of the invention make high integrity solder joints and seals ("hermetic") between abutting components having mismatched coefficients of thermal expansion even when the components are subject to thermal cycling. The resulting solder seal is unusually thin, having a thickness often less than 20 µm and preferably about 5 µm.

The solder geometry is selected to ensure that the solder is not subject to significant compressive or tensile stress. In particular, an optimum shape for the solder seal is a thin toroid that has a diameter (D) much larger than its footprint (d), which in turn is much larger than the thickness (T) of the solder seal (D>>d>>T). With this joint geometry, the solder is only subject to uniaxial shear. Some solders such as indium solders are known to rapidly and totally recover induced work hardening, even at subzero temperatures and therefore creep very readily. Accordingly, when such solders are used, the uniaxial shear resulting from thermal expansion or contraction does not cause microstructural changes in the solder or any accumulation of internal energy, so the quality of the hermetic seal is unaffected by thermal cycling.

One specific embodiment of the invention is a solder joint or seal for first and second components having dissimilar coefficients of thermal expansion. Example materials for the components that can be joined include but are not limited to metal, semiconductors, ceramics, and glass. In an optical switch, for example, the solder joint or seal attaches a silicon chip to a quartz plate.

Solder that is between and attached to the first and second components has a thickness less than 20 $\mu$m (preferably about 5 $\mu$m) and has a tendency to creep in response to shearing stress caused by differential thermal expansion of the first and second components. An indium-based alloy (e.g., an indium-tin solder that is 48% tin by weight) can provide the desired solder properties.

For a seal, the solder has a toroidal shape and surrounds a cavity formed between the first and second components. The toroidal shape is such that differential thermal expansion of the first and second components fails to cause significant compressive, tensile, or tangential stress in the solder. In exemplary configurations, the toroidal shape has a diameter, a footprint, and a thickness in proportions 5000:200:1.

BRIEF DESCRIPTION OF THE DRAWINGS

Use of the same reference symbols in different figures indicates similar or identical items.

DETAILED DESCRIPTION

In accordance with an aspect of the invention, a judicious combination of solder alloy and joint geometry provides a solder seal with a high degree of mechanical robustness when joining materials having dissimilar coefficients of expansion. Counter intuitively, preferred solders have a poor reputation for ability to withstand thermo-mechanical fatigue. Additionally, the seal geometry deliberately maximizes a stress distribution that would normally result in failure by fatigue. One such solder seal is unusually thin, having a thickness (T) typically less than 20 $\mu$m and preferably about 5 $\mu$m while conventional soldered joints are typically 25 to 50 $\mu$m thick. An optimum shape for the solder seal is a thin toroid having a diameter (D)) much larger than the toroid's footprint (d), which in turn is much larger than the thickness T of the solder seal (D>>d>>T). This geometry ensures that the solder is not subject to significant compressive or tensile stress, either directly or owing to the difference in the Poission's ratio between the components and the solder.

Figure 2A:
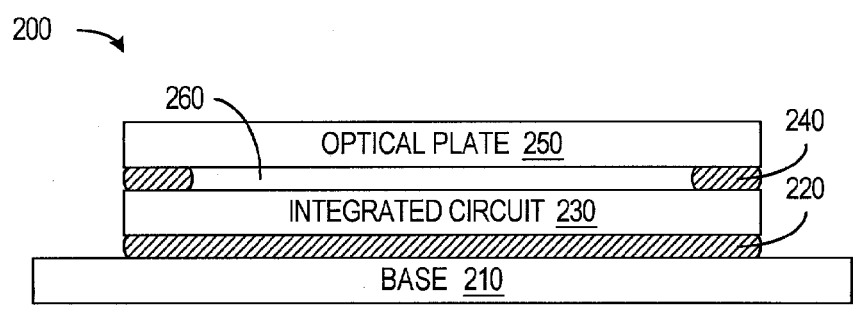
FIGS. 2A and 2B respectively show a cross-sectional view and a plan view of an optical switch in accordance with an embodiment of the present invention.

FIG. 2A shows a cross-sectional view of an optical switch 200 in accordance with an embodiment of the invention. Optical switch 200 includes a base 210, an integrated circuit 230, and an optical plate 250. Base 210 is made of a metal such as molybdenum and serves to strengthen and provide a heat sink for integrated circuit 230. Integrated circuit 230 contains active circuitry that operates switching sites in optical switch 200 to control the routing of optical signals through optical switch 200, and optical plate 250 carries the optical signals and is made of an optical material such as fused silica (quartz). A solder joint 220 attaches integrated circuit 230 to base 210, and a solder seal 240 attaches optical plate 250 to integrated circuit 230. To complete solder seal 240, the silicon and quartz parts 230 and 250 must be metalized.

Solder seal 240 holds optical plate 250 a small distance (typically 2 to 20 $\mu$m and preferably 5 $\mu$m) away from an active surface of integrated circuit 230 to thereby form a cavity 260 between integrated circuit 230 and optical plate 250.

Fabrication of solder seal 240 begins with proper fabrication of integrated circuit 230 and optical plate 250. More particularly, each of integrated circuit 230 and optical plate 250 has a planar surface that is partially metalized for soldering. In the exemplary embodiment of the invention, integrated circuit 230 has a silicon surface that is metalized using standard techniques such as sputtering, chemical vapor deposition, or electroplating. The metal can either be selectively deposited or selectively etched using standard photolithography techniques to form a ring-shaped metal region (not shown). Similarly, optical plate 250, which is quartz in the exemplary embodiment, is metalized using standard techniques to form with a matching ring-shaped region of a metal.

In one embodiment, the metal on integrated circuit 230 and/or optical plate 250 is a three-layer deposit including an adhesion metal such as titanium or nickel, overlaid with a barrier metal such as platinum or copper, and finished with a tarnish resistant and aesthetic coating that is typically gold. The exact choice of individual metals, thicknesses, and application methods depends on a number of technical and economic factors that are generally well known. In the exemplary embodiment of the invention, the metalization on integrated circuit 230 and optical 250 includes a 0.1-$\mu$m titanium layer, a 0.1-$\mu$m platinum layer, and a 0.1-$\mu$m gold layer sequentially applied by sputter deposition and then patterned by lift-off photolithography.

Soldering follows industry standard "good practice" in terms of equipment and process. In particular, base 210 can be pre-coated with a higher melting point solder, such as pure indium (melting point 159° C.), to which integrated circuit 230 is attached in a first soldering process. This can be with or without use of a pressure variation process such as described in a co-owned U.S. patent application Ser. No. 10/124,174, entitled "Vented Cavity, Hermetic Solder Seal", which is hereby incorporated by reference in its entirety. Optical plate 250 can be obtained with a thin coating of the desired In—Sn solder (melting point 119° C.) already applied to the ring-shaped region of metal. In—Sn can be applied by evaporation immediately after deposition of the ring metal and patterned by a lift-off photoresist process. The integrated circuit 230 and optical plate 250 are then aligned and the entire structure is heated to the soldering temperature for the lower melting point solder.

Integrated circuit 230 and metal plate 210 include openings (not shown) that form a vent for cavity 260. To complete optical switch 200, cavity 260 is filled with a fluid via the vent to cavity 260, and then the vent is plugged or otherwise sealed. Solder seal 240 must hermetically seal cavity 260 to prevent contamination of the fluid, keep the fluid in cavity 260, and provide optical switch 200 with an acceptable useful life.

Figure 1A:
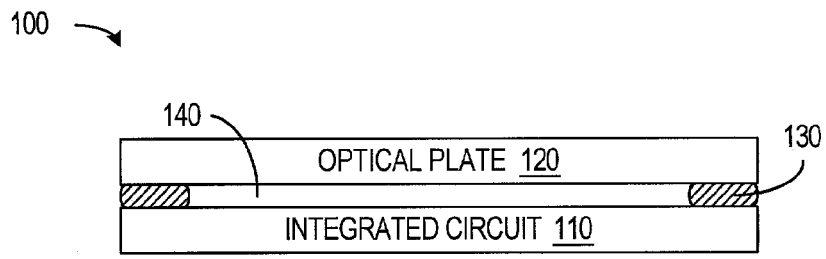
FIGS. 1A and 1B respectively show a cross-sectional view and a plan view of an optical switch.
Figure 1B:
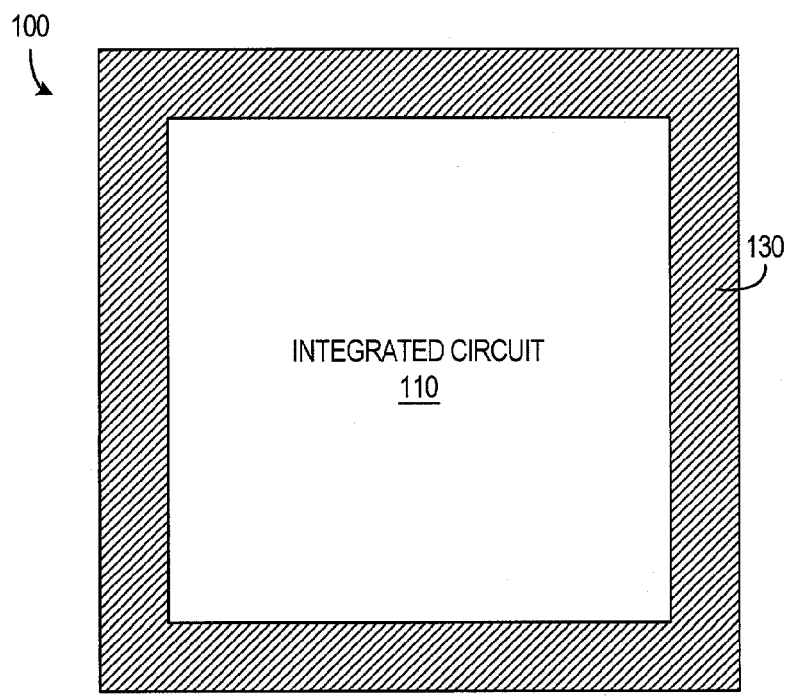
Figure 2B:
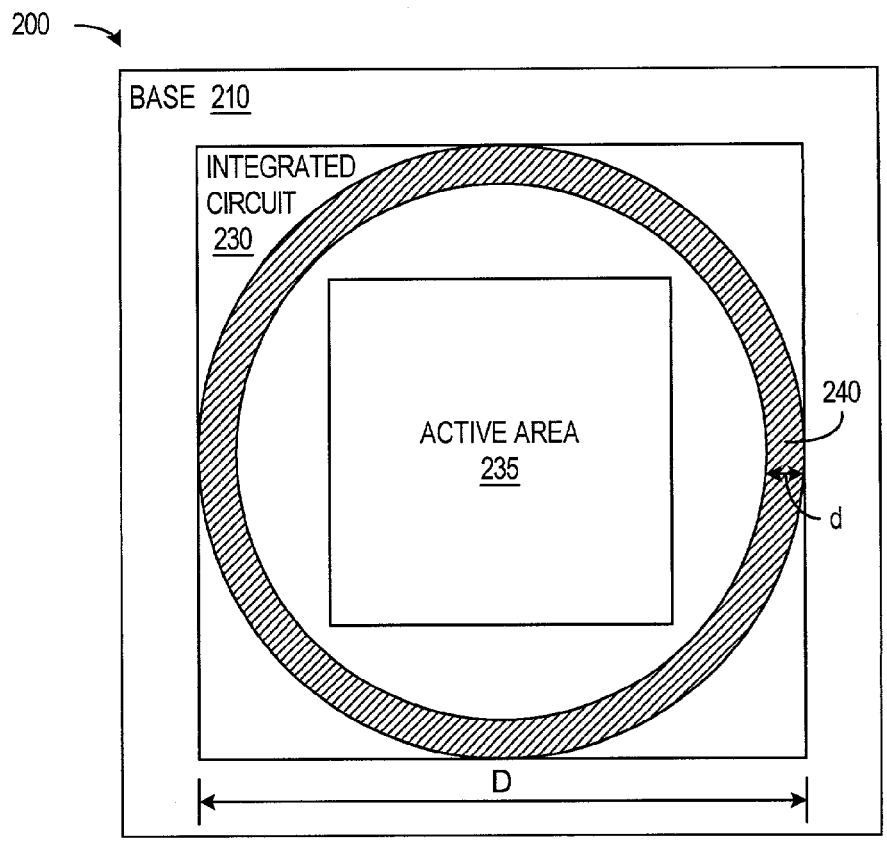

FIG. 2B shows a plan view of optical switch 200 with optical plate 250 removed. As shown, solder seal 240 has a toroidal shape and a circular perimeter of diameter D, which is typically about 15 to 20 mm. Solder seal 240 being less than 20 μm thick is not subject to significant tensile strain that would otherwise arise from the difference in the Poisson's ratio of solder seal 240 and the abutting parts 230 and 250. The axially symmetric shape of solder seal 240 avoids concentration of stress at particular locations such as the corners in seal 130 of FIG. 1B. As a result, the stress arising from differential thermal expansion in optical switch 200 is thus uniform and predominantly radial. The tangential and tensile strains in solder seal 240 are orders of magnitude smaller than the radial shear strain. This abnormal stress regime means that on each thermal cycle, solder seal 240 is subject solely to uniaxial shear.

The foot print d of seal 240 needs to be sufficiently wide to provide a moderate degree of mechanical robustness, which is many times greater than that necessary to prevent diffusion of gas through solder seal 240. However, footprint d should not be so wide that the difference between the inner and outer diameters introduces circumferential (tensile) strain on thermal cycling. In one exemplary embodiment, footprint d is about 0.8 mm wide for a diameter D of 18 mm, which is large enough that all of the desired active area 235 on integrated circuit 230 is enclosed within solder seal 240. Another suitable geometry for solder seal 240 has dimensions D, d, and T in approximate proportions 5000:200:1. Larger proportions could be used without upper limit, but the proportions are preferably greater than about 250:10:1.

The preferred solder for solder seal 240 is a solder that has a propensity to creep. Solders with suitable creep properties are those with a stress rupture life of less than about 1,000 minutes at an applied stress of 5 MN·m$^{-2}$ at the temperature of interest. Suitable solders can also be identified by both constituent phases having either simple crystal structures, such as face center cubic, or are electron compounds and are to be operated at high homologous temperature (operating temperature c.f. melting point). An indium-based alloy and in particular the In-48Sn composition solder generally has the desired properties.

In conventional soldered joints, indium-tin solders are not particularly robust. Any tensile component of the resolved forces acting through an indium-tin solder can result in material distribution by creep, leading to voids and the evolution of fracture surfaces. However, solder seal 240 having dimensions such that diameter D is much greater than footprint d which is much greater than thickness T (i.e., D>>d>>T) is only subject to axial shear. Accordingly, the ability of indium solders to rapidly and totally recover induced work hardening, even at sub-zero temperatures, avoids microscopic structural changes in the solder and avoids accumulation of internal energy. Thermal cycling thus does not affect the quality or hermeticity of solder seal 240. The In-48Sn solder has other desirable attributes such as low soldering temperature and favorable soldering characteristics that render In-48Sn solder a good choice for optical switch 200.

Figure 3A:
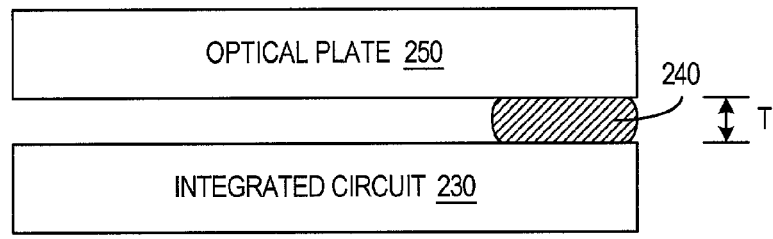
FIGS. 3A and 3B are cross-sectional views illustrating the effects of thermal expansion on a portion of a solder seal in accordance with an embodiment the invention.
Figure 3B:
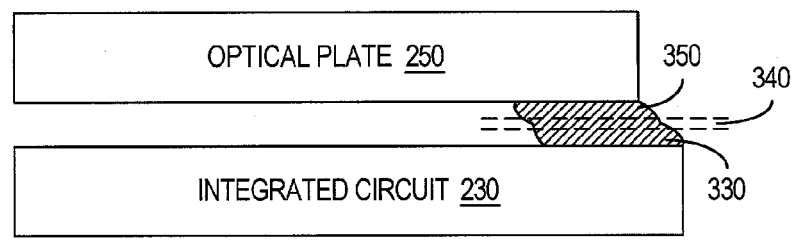

FIGS. 3A and 3B illustrate thermal cycling of solder seal 240. FIG. 3A shows a cross-sectional view of solder joint 240 at a stress neutral temperature. FIG. 3B shows the same solder seal 240 at a temperature where integrated circuit 230 has expanded relative to optical plate 250. The relative expansion applies an axial shearing stress to solder seal 240.

FIG. 3B shows how solder joint 240 includes regions 330 and 350 that are adjacent to and attached to metal regions (not shown) on integrated circuit 330 and optical plate 350, respectively. Integrated circuit 230 and optical plate 250 reinforce regions 330 and 350 making regions 330 and 350 less susceptible to strain. A central region 340 of solder seal 240 that experiences stress is thin since solder seal 240 is thin, but the stress in region 350 is an axial shearing stress that causes creep in solder seal 240 without introducing voids that would cause seal 240 to fail. When the temperature drops back to that of FIG. 3A, solder in region 350 creeps back to the initial configuration of FIG. 3A. Use of a solder such as an indium-tin solder avoids work hardening that might otherwise result from thermal cycling. According, solder seal 240 can withstand thermal cycling when joining materials with differing coefficients of thermal expansion.

Although the invention has been described with reference to particular embodiments, the description is only an example of the invention's application and should not be taken as a limitation. Various adaptations and combinations of features of the embodiments disclosed are within the scope of the invention as defined by the following

What is claimed is:

1. A solder joint comprising:
   first and second components having different coefficients of thermal expansion; and
   solder between and attached to the first and second components, wherein the solder has a toroidal shape and surrounds a cavity formed between the first and second components, and the solder is an indium based alloy that is 48% tin by weight.

2. The solder joint of claim 1, wherein the solder has a stress rupture life of less than about 1,000 minutes at an applied stress of 5 MN·m$^{-2}$ at an operating temperature of the solder joint.

3. The solder joint of claim 1, wherein the toroidal shape is such that thermal expansion of the first and second components fails to cause significant tensile or tangential stress in the solder.

4. The solder joint of claim 3, wherein the solder has a thickness less than 20 μm.

5. The solder joint of claim 3, wherein the solder has a thickness no greater than 5 μm.

6. The solder joint of claim 1, wherein a footprint of the solder is more than 10 times a thickness of the solder.

7. The solder joint of claim 1, wherein a footprint of the solder is about 200 times a thickness of the solder.

8. The solder joint of claim 1, wherein the solder has a thickness less than 20 μm.

9. The solder joint of claim 1, wherein the solder has a thickness no greater than 5 μm.

10. A solder joint comprising:
    first and second components having dissimilar coefficients of thermal expansion; and
    solder between and attached to the first and second components, wherein the solder has a thickness less than 20 μm and has a tendency to creep in response to shearing stress caused by thermal expansion of the first and second components, and wherein the solder is an indium based alloy that is 48% tin by weight.

11. The solder joint of claim 10, wherein the solder has a thickness no greater than 5 μm.

12. The solder joint of claim 10, wherein the solder has a stress rupture life of less than about 1,000 minutes at an applied stress of 5 MN·m$^{-2}$ at an operating temperature of the solder joint.

* * * * *